FIG. I.

United States Patent Office 3,554,715
Patented Jan. 12, 1971

3,554,715
CROSS FLOW ARC HEATER APPARATUS AND PROCESS FOR THE SYNTHESIS OF CARBON, ACETYLENE AND OTHER GASES
Armin M. Bruning, Export, Peter F. Kienast, Pittsburgh, George A. Kemeny, Export, and Chikara Hirayama Murrysville, Pa., assignors to Westinghouse Electric Corporation, Pittsburgh, Pa., a corporation of Pennsylvania
Filed Nov. 12, 1965, Ser. No. 507,345
Int. Cl. H05b 7/18
U.S. Cl. 48—197       16 Claims

ABSTRACT OF THE DISCLOSURE

A gas arc heater for chemical processing in one embodiment has concentric annular electrodes each having a magnetic field coil therein near the arcing surface so that a radially extending arc between electrodes is caused to move substantially continuously in an annular path around the arcing surfaces of the electrodes. A process gas to be pyrolized is admitted into the arc chamber at a plurality of peripherally spaced positions where it passes directly through the rotating arc path and is pyrolized by the arc. A quenching gas is admitted at a plurality of peripherally spaced positions which may be around the outside of the electrode of larger diameter or around the inside of the electrode of smaller diameter, or both, the quenching gas mixing with pyrolized process gas and producing a gas mixture in which a desired recombination product is present at a certain temperature in substantial proportion. A tube slidable into the arc chamber through the central aperture of the annular electrode of smaller diameter has a number of small passageways therein for, if desired, introducing a quenching fluid or a fluid to "freeze" the recombination product to prevent further undesired chemical reactions. Additionally a gas or other fluid, process, quenching or other, may be introduced into the arc chamber at a plurality of peripherally spaced positions around the outside of the nozzle, and the nozzle has a plurality of axially and peripherally spaced bores passing through the surface thereof all communicating with fluid flow passageways for cooling fluid for injecting a "freezing" fluid into the gas mixture as it leaves the nozzle. The invention includes means for accomplishing quenching by causing a fias flow rate in the arc chamber which causes pyrolized gas to move in a predetermined time to a predetermined position distant from the arc path where the pyrolyzed gas is cooled to a quenching temperature due to the normal drop in arc chamber temperature at that position. In another embodiment the heated gas mixture is caused to flow through a narrow throat portion of a nozzle and the speed thereof increased thence expanding into a portion of large volume where the speed of the gas is further increased with a conversion of heat energy to kinetic energy occurring and further cooling of the gas occurs. The second embodiment may include means for injecting a "freezing" fluid if desired, and may include heat exchanger means if desired.

This invention relates to improvements in apparatus for the pyrolysis and synthesis of hydrocarbons, and more particularly to apparatus utilizing a cross flow arc heater for pyrolyzing a process gas which is thereafter quickly quenched to a temperature at which a desired recombination product is present in substantial proportion.

It is old in the art to utilize an arc heater for pyrolyzing a gas which is thereafter quickly quenched to some desired temperature and recombination product obtained. For example, in British Pat. No. 938,823 issued to E. I. du Pont de Nemours & Co., there is shown apparatus in which gas is heated and pyrolized by an arc, a quenching gas is introduced into the heated gas at a substantial time interval after pyrolysis, and after the mixture of the decomposed process gas and quenching gas has moved down the mixing chamber, a spray of fluid is injected into the mixture to further cool the gas mixture and permit the desired recombination product to be removed.

It is to be noted though, that in this prior art patent and other prior art patents, the yield may be degraded by producing unwanted reactions. For example, quenching by water at high temperature is undesirable because some of the water will be disassociated and the oxygen will then reduce the desired yields by a combustion reaction.

Furthermore, most prior art devices do not provide for quenching which is sufficiently rapid, that is, a substantial time interval elapses between pyrolysis and quenching.

We have devised an apparatus and method for the production of acetylene, ethylene $C_3H_6$, hydrogen and carbon, singly or in combination, from a suitable raw material such as methane, or other hydrocarbons which may be in the form of a solid, liquid or gas, and the use of a cross-flow type of arc heater which we propose for heating the incoming raw material, and quenching means designed to obtain a high yield of the desired constituent products, are provided.

Our hot arc heater effluent is rapidly quenched to a lower temperature without the introduction of such components as may degrade the yield by producing unwanted reactions. We accomplish quenching by the rapid movement of pyrolized gas out of the arc path to a cooler portion of the chamber, and also by the use of, for example, added hydrocarbons in liquid or gaseous states to attain rapid mixing of hot and cold flows and therefore rapid quenching.

This application is related to the copending application of C. Hirayama et al. for "Method and Equipment for the Pyrolysis and Synthesis of Hydrocarbons and Other Gases and Arc Heater Apparatus for Use Therein," Ser. No. 446,012, filed Apr. 6, 1965, now issued U.S. Pat. No. 3,389,189; the application of P. F. Kienast et al. for "Arc Heater Apparatus for Chemical Processing," Ser. No. 471,914, filed July 14, 1965, now U.S. Pat. No. 3,345,-191; the application of D. A. Maniero et al. for "Direct Conversion Chemical Processing Arc Heater," Ser. No. 527,789, filed Jan. 16, 1966 now U.S. Pat. No. 3,284,782; and the application of D. A. Maniero et al. for "Process for Hydrogen Cyanide and Acetylene Production in an Arc Heater Having a Rotating Arc," Ser. No. 657,867, filed Aug. 2, 1967, now U.S. Pat. No. 3,460,902, the above-identified application and patents being assigned to the assignee of the instant invention.

In summary, we employ a cross-flow arc heater, that is, an arc heating device in which the arc is made to move through the gas flow. Direct-current field coils located roughly centrally in each electrode set up a magnetic field which rapidly spins the arc column through the gas flow. This results in good mixing of the hot gases, which is not obtained by the prior art coaxial flow type heater in which a very hot central column of gas surrounded by much colder gas is vortex stabilized in a tube. In our cross flow type heater with a large exit diameter nozzle, the residence time of hot gases in the heater is reduced, and the short reaction times required for obtaining maximum yield without excessive degradation to less desirable constituents is provided.

Our apparatus includes means for adjusting the flow rate of the process gas through the arc heater, means for adjusting the power of the arc, and means for adjusting the strength of the magnetic field which causes the arc to rotate, to thereby provide further control of the rate of rotation.

We have devised and invented a new process for synthesizing a desired product from a different process gas without the necessity for employing any quenching gas or liquid. In accordance with the power of the arc and the rate of rotation, we force a process gas through the arc heater at a selected or adjusted flow rate; the gas is decomposed by the arc and substantially immediately, because of the flow, moved away from the arc path and cooled to a temperature at which the desired recombination product is present in substantial proportion.

The insulators within the arc chamber of one embodiment of our invention are kept from contamination by gas injection, and the restricted passage size downstream of the insulators is adapted to have high coolant gas velocity, so that solids and vapors cannot penetrate to the insulators.

In one embodiment of the invention, a quenching tube brings in coolants to obtain rapid quenching, and the quenching tube can be moved to provide quenching at the most desirable location, that is, the quenching fluid can be introduced at a selected position upstream or downstream of the arc path.

In another embodiment the effluent while at an intermediate temperature is additionally cooled, for example, by means of water spraying or by a suitable heat exchanger. The heat exchanger utilized has numerous flat cool plates with sufficient gas velocity between the plates to blow out any carbon or other solid which might otherwise clog the passages.

In still a further embodiment of the invention we provide that by having sufficient arc heater pressure and a convergent-divergent nozzle, the effluent gas is accelerated to supersonic velocity downstream of the nozzle throat. The quenching is thus aerodynamically accomplished because in the supersonic version the free stream gas temperatures become much lower, thus in effect quenching the effluent gas. A heat exchanger may be provided with surfaces designed to result in as little temperature recovery as possible; by utilizing this embodiment and by utilizing higher gas velocities, the time delay between the heating in the arc heater and cooling is further reduced, which results in less degradation to undesired constituents. Following the heat exchanger in either of the last two embodiments a settling chamber and a suitable dust separator are utilized to remove solid constituents such as carbon. The constituent gases can subsequently be separated by any of various methods known in the art.

Accordingly, it is a primary object of the invention to provide new and improved arc heater apparatus for the pyrolysis and synthesis of hydrocarbons offering advantages over any now known in the art.

Another object is to provide new and improved cross flow arc heater apparatus for the production of a hydrocarbon by pyrolysis and synthesis.

Still another object is to provide new and improved arc heater gas synthesis apparatus in which the time interval between pyrolysis and quenching is made very short.

A further object is to provide new and improved methods and processes for synthesizing a product from a process gas having a different chemical structure.

These and other objects will become more clearly apparent after a study of the following specification, when read in connection with the accompanying drawings, in which.

Figure 1:
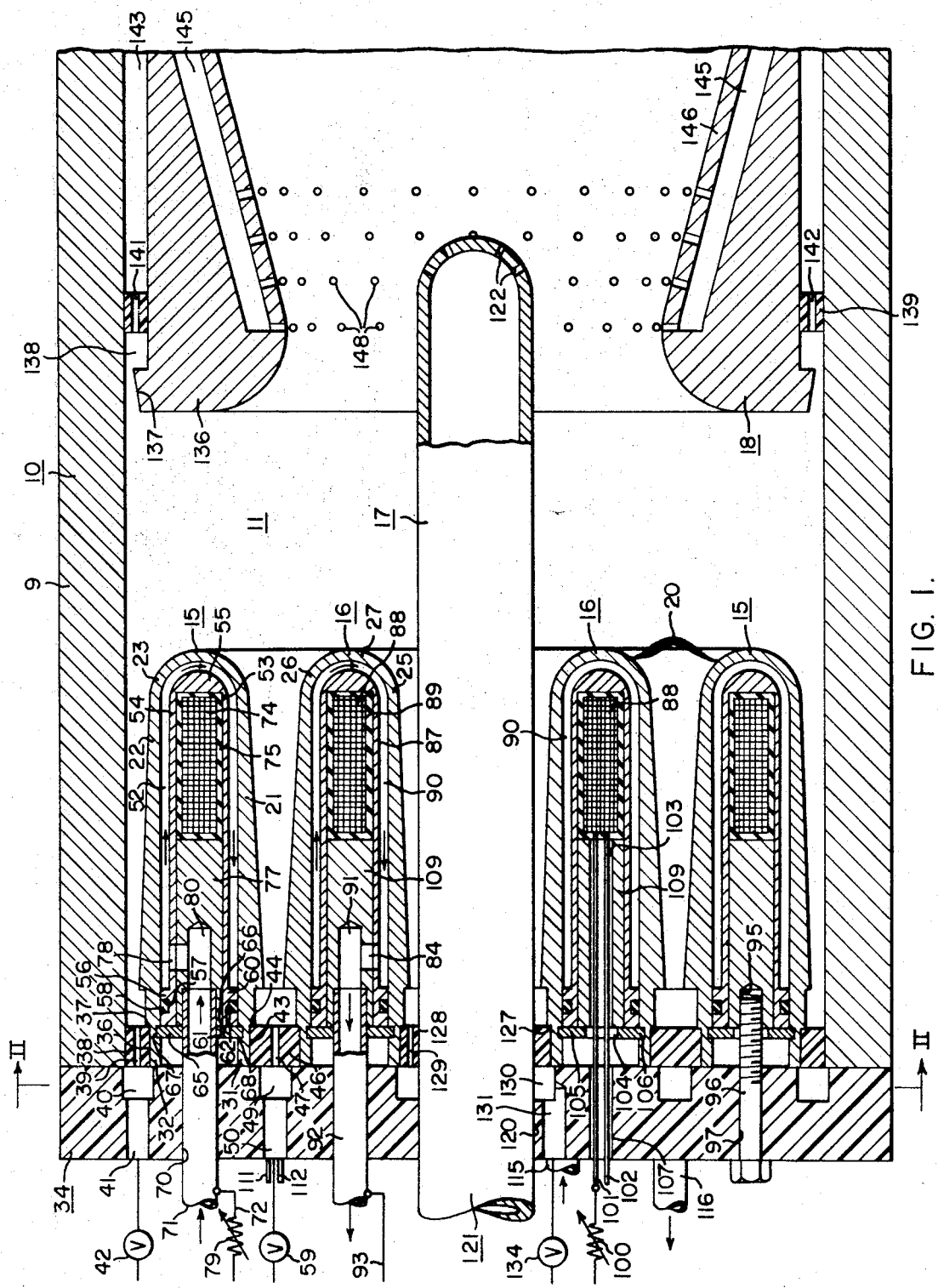
FIG. 1 is a sectional view of an arc heater according to one embodiment of our invention, the sectional view of FIG. 1 being in two planes substantially 135° with respect to each other, the planes intersecting at the longitudinal axis of the arc heater.

Referring now to the drawings, in which like reference numerals are used throughout to designate like parts for a more detailed understanding of the invention, and in particular to FIG. 1 thereof, an arc heater generally designated 10 forms an arc chamber 11, the chamber forming means 10 being generally cylindrical if desired and having cylindrical wall portion 9 and having disposed therein and electrically insulated from each other, two annular electrodes generally designated 15 and 16, a quenching tube generally designated 17, and nozzle means generally designated 18.

Electrode 15 is seen in FIG. 1 to be generally in the form of an annular cup with inner wall portion 21, outer wall portion 22, these being substantially cylindrical in shape, and a rounded end wall portion 23. All of the wall portions are composed of a highly electrically conductive and heat conductive material such as copper. The aforementioned electrode 16 has inner and outer cylindrical wall portions 25 and 26 with an annular end portion of curved cross section 27, electrode 16 being composed of highly heat conductive and electrically conductive material. By means hereinafter to be described electrodes 15 and 16 have a source of potential connected thereacross for producing the arc 20 shown taking place in the arc chamber generally designated 11.

The annular ends or edges 31 and 32 of the aforementioned inner and outer wall portions 21 and 22 respectively abut against an end plate generally designated 34 composed of insulating material such for example as Micarta, the outer end 32 having a groove therein forming an annular shoulder 37. Disposed in this annular groove 36 between the wall 22 and the adjacent inner surface of the cylindrical wall portion 9 of the arc heater 10 is an annular ring 38 composed of electrically insulating material which is also preferably highly refractory, the ring 38 having a plurality of bores 39 at spaced intervals around the periphery thereof. These bores 39 communicate between the chamber 11 and an adjacent annular gas header 40 cut or machined in the aforementioned end plate 34 and having a gas inlet 41 communicating therewith. Means, symbolized by valve 42, is provided for adjusting and controlling the flow rate of gas admitted at 41. Additional bores 39 are shown in the cross-sectional view in FIG. 2 the plane of which passes through the aforementioned annular gas header 40.

Figure 2:
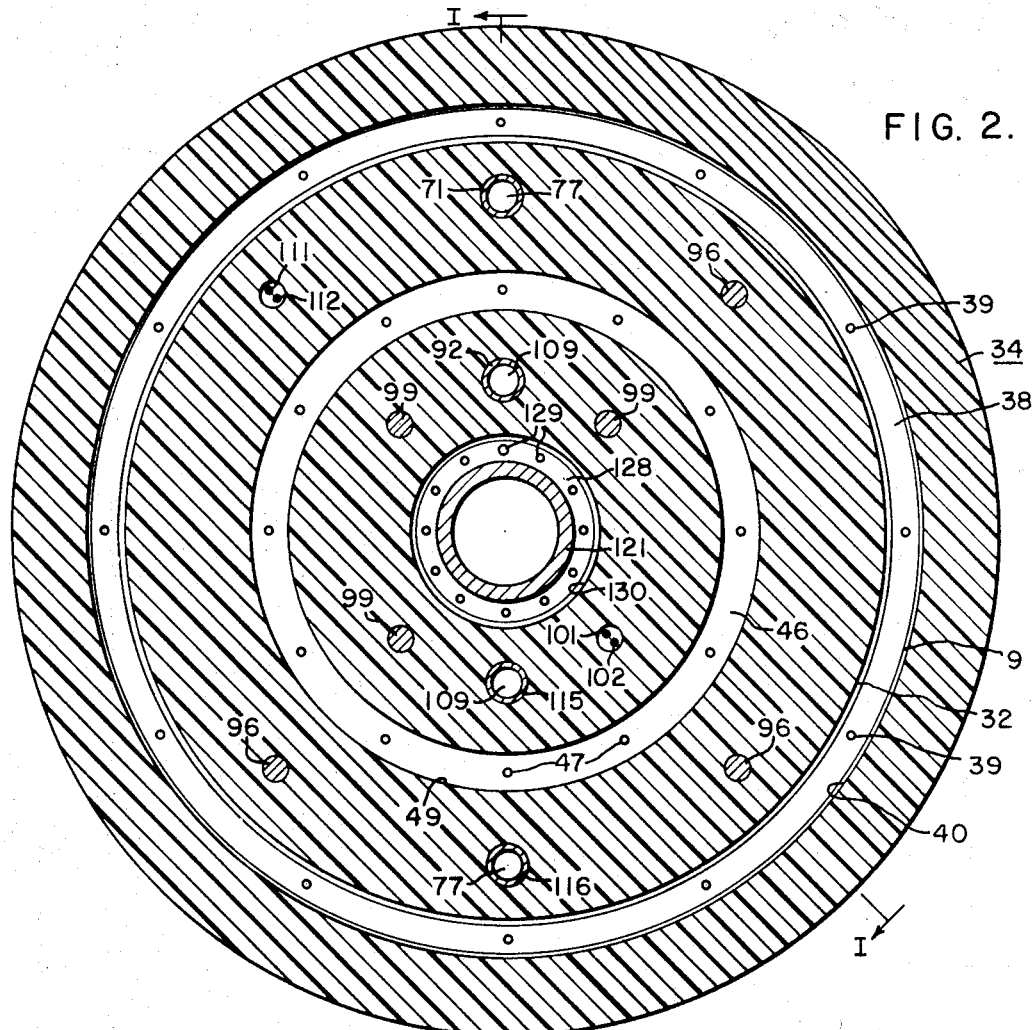
FIG. 2 is a cross section in a plane along the line II—II of FIG. 1.

The aforementioned inner cylindrical wall 21 also has a groove 43 cut therein near the end 31, forming an annular shoulder 44. Mounted adjacent the surface of the groove 43 and maintained in position by the shoulder 44 is an annular ring 46 composed of insulating material having spaced bores 47 passing therethrough, the annular ring 46 being disposed between electrode 15 and electrode 16 for reasons to become hereinafter more clearly apparent. Bore 47 communicates between the chamber 11 and an annular gas header 49 having gas inlet 50. Additional bores 47 are seen in FIG. 2. Means, symbolized by valve 59, is provided for adjusting or controlling the flow rate of gas admitted at gas inlet 50.

The inside of the aforementioned electrode 15 is seen to include a generally annular ring member 52, generally U-shaped in cross-section, having cylindrical wall portions 53 and 54 and an end portion 55 generally semicircular in cross-section. The left-hand end of the ring member 52 is seen to include an annular flange portion 56 having an annular groove 57 therein in which is disposed an O-ring 58. Wall portion 53 also has a flange portion 60 with an annular groove 61 therein for O-ring 62. The ends of the flange portions 56 and 60 are seen to abut against two annular retaining rings 65 and 66 respectively, which have portions passing into slots 67 and 68 to be retained in position therein.

Passing through an aperture 70 in the aforementioned end plate 34 is a fluid conduit 71 which is composed of electrically conductive material. Conduit 71 has a source of potential connected thereto symbolized by lead means 72 for bringing a current to the electrode 15 to produce and sustain the aforementioned arc 20 between electrodes 15 and 16. Means for adjusting the valve of the arc current is symbolized by rheostat 79.

Disposed within the aforementioned annular U-shaped ring member 52 is a field coil 74 in a housing 75 composed of insulating material, the space between the left-hand end of the housing 75 and the aforementioned annular rings 65 and 66 being filled with a generally annular ring member 77 having an annular fluid header 78 therein communicating with U-shaped passageway 81 and also communicating with a bore 80 which constitutes an extension of the opening in the aforementioned conduit 71. It is seen that the U-shaped passageway 81 extends around the entire annular U-shaped ring member 52 forming a passageway for the flow of fluid from the fluid inlet header 78 in a path adjacent the inside wall of the electrode arcing surface. After fluid has flown around the U-shaped passageway in the direction indicated by the arrows, it reaches a fluid outlet header on the opposite side of the electrode. Because of the cross-section in which the view is taken, the fluid outlet header of electrode 15 is not shown, but the fluid outlet header of electrode 15 is substantially similar to fluid outlet header 84 of electrode 16 hereinafter to be described in detail. Even though only one inlet header and outlet header are shown it is understood that a multiplicity of such inlet and outlet headers may be utilized. This cooling fluid conducts heat flux away from the surface of the electrode, which is preferably composed of a highly heat conductive material such as copper. This heat flux develops as the result of the intensely hot arc spot of arc 20 as well as a result of radiation and conduction of heat from the arc and conductive or incandescent gases in the arc chamber.

The aforementioned electrode 16 is generally similar to electrode 15 and the parts thereof need not be described inasmuch exact detail. Generally speaking, disposed within the electrode 16 there is a U-shaped annular ring member 87 having a coil 88 and coil housing 89 therein, the U-shaped annular ring member 87 forming an annular passageway generally cup-shaped or U-shaped around the entire ring member, this passageway being shown at 90. The output end of the passageway 90 communicates with the aforementioned fluid outlet header 84, which communicates with a bore 91, and thence to the inside of conduit 92 composed of electrically conductive material and having lead 93 connected thereto. The fluid inlet header for the passageway 90 is not shown in the particular plane of the cross-section selected for illustration, but corresponds to the fluid inlet header 78 of electrode 15. Lead 93 is connected to the other terminal of the source to which 72 is connected, for producing a potential difference between electrodes 15 and 16 to produce the aforementioned arc 20.

With further reference to electrode 15, the annular ring member 77 has threaded bores 95 therein at spaced intervals around the periphery of the electrode for receiving the ends of bolts 96 passing through bores 97 in the end plate generally designated 34, to hold the electrode in position in the arc chamber. It will be understood that electrode 16 also has spaced bolts to hold the electrode in position, these being shown at 99 in FIG. 2.

At another position around the periphery of the electrode 15 there are leads to the aforementioned coil 74, these not being seen in the cross-section chosen for illustration in FIG. 1, but the leads to the field coil of the electrode 15 may be similar to those of the field coil 88 of electrode 16. These leads 101 and 102 are seen extending through a bore 103 in the annular ring supporting member 109 and thence pass through the space 104 between annular rings 105 and 106 and thence pass through a bore 107 in the aforementioned end plate 34 composed of insulating material. Means is provided, symbolized by rheostat 100, for varying the strength of the magnetic field to thereby vary and control the rate of rotation of the arc 20. The leads to field coil 74 of electrode 15 are shown at 111 and 112, FIG. 2.

The fluid inlet conduit for electrode 16 is shown at 115, FIGS. 1 and 2, and the fluid outlet conduit for electrode 15 is shown at 116, FIGS. 1 and 2, these passing through the end plate 34 but not in the plane selected for illustration in FIG. 1. It will be understood that these inlet and outlet conduits communicate with fluid headers in the respective electrodes.

The end plate 34 is seen to have a bore of large diameter 120 passing therethrough, through which extends substantially along the axis of the arc chamber 11 a tubular member 121 for bringing a quenching fluid into the chamber, the member 121 being slidable in the bore 120 and having numerous spaced apertures 122 in the end thereof for admitting either a gas or a liquid into the arc chamber 11 for quenching purposes.

Seated in an annular groove 127 in the inside surface of electrode 16, that is, in the wall 25 thereof, is a ring member 128 composed of electrically insulating material and having a plurality of bores 129 therethrough at spaced intervals around the periphery thereof communicating between the interior of the chamber 11 and an annular gas inlet header 130, having gas inlet 131 connected thereto. Means symbolized by valve 134 is provided for adjusting or controlling the flow rate of gas admitted at inlet 131.

There is provided then, lead means 93 and 72 for bringing a potential to electrodes 16 and 15 respectively to produce the arc 20, the electrodes 15 and 16 being insulated from each other, being insulated from the quenching member 121 and being insulated from the cylindrical wall 9 of the arc heater. Conduit 71 which may be connected by way of a hydraulic insulator, not shown for simplicity of illustration, to a source of cooling fluid under pressure, and brings a cooling fluid to fluid header 78; from thence the fluid flows through passageway 81 to a fluid outlet header and out of the aforementioned conduit 116. With respect to electrode 16, fluid enters at the inlet conduit 115, flows around the U-shaped passageway 90, out of the annular fluid header 84 into the bore 91 and out of the conduit 92, completing a passage for the flow of cooling fluid throughout the cooling passageways of electrode 16. Lead means 101 and 102 bring an energizing potential to the field coil 88 of electrode 16, this potential preferably being direct current, and lead means 111 and 112, FIG. 2, bring an energizing potential to the field coil 74 of electrode 15. Coils 74 and 88 are energized with their fields in opposition to produce a field between the coils which substantially follows the contour of the electrodes and is substantially transverse to the arc path and also transverse to the direction of current, so that a component of force is exerted on the arc which causes the arc to rotate substantially continuously in a closed circular path about the two electrodes.

While only the process gas brought into the chamber through bores 47 passes through the arc path, the process gas in some applications may be brought into the arc chamber 11 through any or all of the three gas inlets provided, that is, bores 39, bores 47, or bores 129, communicating with gas headers 40, 49 and 130 respectively, having gas inlets 41, 50 and 131 respectively. For example, the process gas may be brought into gas header 49 and in through bores 47 between electrodes 15 and 16, in which case this gas will have to pass through the path of the arc 20, insuring substantially uniform heating and other advantages heretofore described. A quenching gas or additional or another process gas may be brought in at 39, and a quenching gas or additional or other process gas may be brought in at 129 if desired.

Particular attention is directed now to the nozzle member generally designated 136 having an annular flange 137 which overhangs an annular passageway 138 and provides optical baffling for an annular ring member 139 composed of electrically insulating material and preferably heat resistant material. The ring member 139 has a plurality of spaced bores therethrough, two of these being shown at 141 and 142. Behind the ring member 139 is a passageway 143 through which an additional quenching gas or liquid may come and pass through the bores including bores 141 and 142, around the edges of the nozzle member and be mixed with the gas in the chamber 11. The nozzle member is seen to have an annular fluid flow passageway 145 therein near the wall 146 thereof, in which wall are numerous bores communicating with the passageway, these bores being shown at 148. If desired, the bores may be at spaced intervals around a circular pattern, with a plurality of axially spaced circles along the length of the nozzle, as shown.

A quenching fluid may be introduced through the bores 148 to quench the gas to a desired temperature. Additionally, a gas or a liquid may be introduced through bores 122 of the quench member 121, the position of which is aforementioned is adjustable, so that the fluid admitted to the chamber 11 through bores 122 may be admitted substantially at the arc path or at any position downstream of the arc path, as well as positions upstream of the arc path. Accordingly, it will be seen that the gas may be quenched at substantially any selected time interval after the gas is pyrolized by the arc 20, and this interval may be adjusted substantially continuously from a fraction of a microsecond to several milliseconds depending upon the position of member 121.

Means, not shown, may be provided for clamping member 121 in its selected position.

There has been provided then, in the apparatus embodied as shown in FIGS. 1 and 2, means for introducing a quenching liquid or gas at a number of positions into the arc chamber, means for introducing a reactant or process gas or gases at a number of positions in the chamber, and means for introducing a quenching gas or liquid at substantially any desired position with respect to the path of the arc, representing any desired elapsed time interval between the pyrolizing of the process gas and the quenching to a predetermined temperature. Furthermore, quenching fluid may be introduced through the aforementioned bores in annular ring member 139, and quenching liquid may be introduced through the bores 148 of the nozzle generally designated 18. A most versatile arc heater arrangement is thereby provided in which by selecting the passageways to be employed and the position of member 121 and the materials to be used for quenching purposes, any desired pyrolizing and synthesizing process may be carried out.

Figure 3:
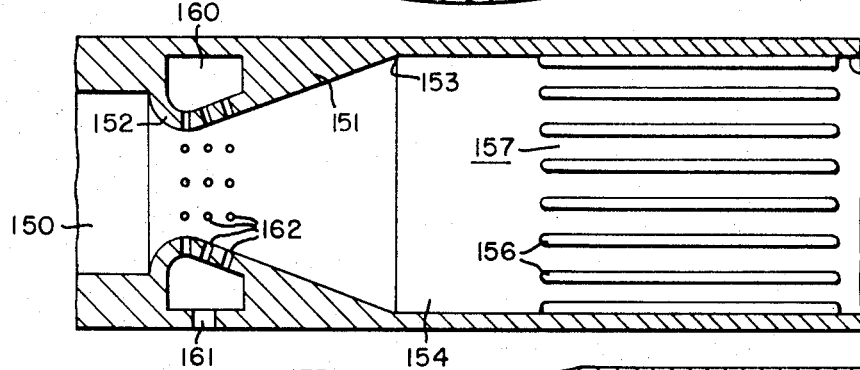
FIG. 3 is a sectional view through apparatus according to a second embodiment of our invention.

Particular reference is made now to FIG. 3 where a second embodiment of an arc heater apparatus for practicing our invention is shown. In FIG. 3, an arc chamber generally designated 150 has electrodes therein for pyrolizing a process gas, the electrodes not being shown for simplicity of illustration, but it will be understood that arc chamber 150 may have electrodes similar to the electrodes of FIG. 1. From the arc chamber 150, the heated gas passes through nozzle portion 151 having throat 152, the nozzle portion 151 having the wall tapering outward to a relatively large portion, of large cross-section and large diameter, 153. From portion 153 and chamber portion 154 the gas passes through a heat exchanger generally designated 157, the plates 156 of which are shown, where carbon or other solid is removed and further cooling may occur, and the final desired gas recombination product is obtained from the chamber portion 158. The carbon may itself be a desired, useful product. It is seen that there is a fluid header 160 in the nozzle portion, having a fluid inlet 161 and having a plurality of spaced bores 162 around the throat, communicating with the fluid header for introducing a quenching fluid. The embodiment of FIG. 3 operates on two principles. Not only is quenching provided in the nozzle by fluid header means 160, but it will be readily understood that the thermal energy of the gas in chamber 150 is converted at least in part to kinetic energy when the gas is made to flow through the narrow throat portion 152 and the speed thereof increases, thence expanding into the portion of large diameter 153 where the speed of the gas is further increased, a further conversion of heat energy to kinetic energy occurs, and further cooling of the gas occurs. Generally speaking, the ratio of the diameter at 153 to the smallest diameter at 152 governs at least in part the speed and degree of cooling, for when the speed of the gas is increased as the passageway is narrowed the gas is cooled, as well as when the gas expands, certain of the heat energy being converted to kinetic energy in the gas flow. Thus in effect quenching is provided. By suitable choice of dimensions and other factors, the gas may be quenched to a temperature at which some desired recombination product is present in substantial proportion. Water spray cooling may be added, if desired.

Figure 4:
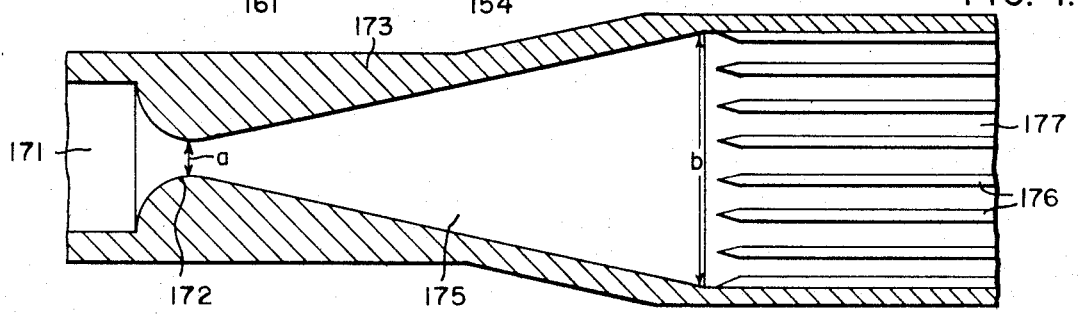
FIG. 4 is a sectional view through apparatus according to a third embodiment of our invention.

Particular reference is made now to FIG. 4, a supersonic version somewhat similar to the apparatus of FIG. 3, in which an arc chamber 171 has gas pyrolized therein, which is made to flow through a very narrow throat 172 in an exhaust nozzle portion 173, the nozzle being of the convergent-divergent type. The effluent gas expands and is accelerated to supersonic velocity downstream of the nozzle throat. It is seen that the diameter of the nozzle portion tapers from a very narrow throat in region $a$ to a relatively large diameter in region $b$, the ratio of diameters $b$ to $a$ governing the speed of cooling the gas. Again, heat energy in the pyrolized gas in chamber 171 is converted to kinetic energy with the cooling of the gas in the nozzle chamber portion 175, in effect of quenching the gas. The plates or fins 176 may be water cooled further quenching the gas, the desired recombination product being obtained at 177. By choice of dimensions, gas pyrolizing temperature and other factors, the quenching temperature may be one at which a desired recombination product is present in substantial proportion.

If desired, portions 158 and 177 may lead to a settling chamber, where carbon is removed from the gas.

There have been provided, then, several varieties of apparatus for practicing the methods of our invention.

Whereas we have shown and described our invention with respect to some embodiments thereof which give satisfactory results, it should be understood that changes may be made and equivalents substituted without departing from the spirit and scope of the invention.

Whereas our methods and processes have been described with respect to apparatus suitable for practicing them, it will be understood that other apparatus could be employed.

We claim as our invention:

1. Process for converting a process gas to a different product gas which comprises causing the process gas to move in a generally cylindrical path at a selected flow rate, producing a substantially continuously moving radially extending electric arc of a selected power at a preselected axial position in said path and causing said arc to move substantially continuously at a selected rate of movement in a path transverse to the direction of gas flow, the arc raising the temperature of the process gas to a temperature at which at least a substantial portion of the process gas is pyrolized, the pyrolized gas being forced away from the arc path at a speed determined by the flow rate of the process gas, said speed being such that the pyrolized gas after passing through the arc path is substantially immediately cooled to a temperature at which the desired recombination product is present in substantial proportion.

2. A process for converting a process gas to a different product gas which comprises introducing the process gas into a confined area generally cylindrical in shape and having an exhaust passageway at one end thereof, causing the process gas to move in a selected path from the other end of the confined area toward the exhaust passageway at a predetermined flow rate, producing a radially extending electric arc of predetermined power at a preselected axial position in said path and causing said radially extending arc to move substantially continuously in the selected path of movement of the gas and transverse to the direction of gas flow, the arc pyrolizing at least a substantial portion of the process gas, and introducing into the pyrolized gas a relatively cool quenching gas at a selectable position selected from positions upstream of the arc path and downstream of the arc to cool the resulting gas mixture to a temperature at which the desired recombination product is present in substantial proportion.

3. The process of synthesizing a desired product gas which comprises passing a process gas moving at a predetermined mass flow rate in a generally cylindrical path through a substantially continuously moving radially extending arc which describes repetitive annular paths in the gas flow path and pyrolizing the process gas, and changing the speed of movement of the process gas after it passes through an arc path to convert thermal energy in the pyrolized gas into kinetic energy and cool the last-named gas to a temperature at which the desired recombination product is present in substantial proportion.

4. The process according to claim 3 including the additional step of adding an auxiliary cooling fluid to the pyrolized process gas at a position downstream of the arc path and upstream of the position where the change in the speed of gas flow is complete.

5. The process according to claim 3 including the additional step of passing the gas after it has changed speed through a settling chamber to obtain solid carbon as a product.

6. Arc heater apparatus for chemical processing comprising, in combination, means forming an arc chamber, first and second axially extending coaxially mounted radially spaced annular electrodes disposed in the arc chamber, means for producing and sustaining a radially extending arc between the first and second electrodes, means for substantially continuously moving the radially extending arc in repetitive annular paths around and between said electrodes, means for introducing a process gas into the chamber at a plurality of peripherally spaced positions all radially between the first and second electrodes whereby substantially all the process gas flows between electrodes and through the arc path and is pyrolized, means for introducing a quenching gas into the chamber around at least one of said first and second electrodes at a plurality of peripherally spaced positions, the quenching gas flowing around the adjacent electrode and mixing with the pyrolized process gas, and nozzle means for the chamber.

7. Arc heater apparatus for chemical processing comprising, in combination, means forming an arc chamber, first and second coaxially mounted radially spaced annular electrodes disposed in the chamber means for producing and sustaining a radially extending arc between the first and second electrodes, means for substantially continuously moving the arc in substantially annular repetitive paths around said electrodes, means for introducing a process gas and a quenching gas into said chamber, one of said gases being introduced at a plurality of peripherally spaced positions all between the first and second electrodes whereby the last-named gas flows through the annular path of movement of the radially extending arc and is heated to a high temperature, and means for introducing the other gas into the chamber around at least one of said first and second electrodes at a plurality of peripherally spaced positions, the heated gas and the other gas mixing in said arc chamber and forming a mixture at a lower temperature than the temperature of the heated gas, and nozzle means for the chamber.

8. An arc heater according to claim 7 additionally characterized as including means for introducing a quenching fluid into the arc chamber at a plurality of peripherally spaced points around the nozzle means.

9. An arc heater according to claim 7 including in addition means for injecting a "freezing" fluid into the gas mixture in the chamber to deter further chemical reactions.

10. An arc heater according to claim 9 in which the means for injecting a "freezing" fluid includes a plurality of axially and peripherally spaced apertures in the nozzle means, and the nozzle means is additionally characterized as including a fluid flow passageway for cooling fluid communicating with all of said apertures.

11. An arc heater according to claim 9 in which the means for injecting a "freezing" fluid is a tube slidably mounted within the upstream wall of the arc heater and slidable through the electrode of smaller diameter and having an axially adjustable position, said tube having a plurality of apertures therein for injecting fluid into the gas mixture in the arc chamber.

12. An arc heater according to claim 11 in which the tube is additionally described as slidable to a position in the arc chamber where the fluid introduced through the tube is mixed with quenching gas entering around the electrode of smaller diameter before said last-named quenching gas is mixed with the gas heated by the electric arc.

13. Arc heater apparatus for chemical processing comprising, in combination, means forming an arc chamber, first and second coaxially and concentrically mounted radially spaced annular electrodes disposed in the chamber, means for producing and sustaining a radially extending arc of adjustable power between the first and second electrodes, means for generating a magnetic field of adjustable strength having a predetermined orientation with respect to the path of the arc current for exerting a force on the arc which is a function of the magnetic field strength and substantially continuously moving the arc in a substantially annular path around and between said electrodes, means for introducing a process gas into the arc chamber at an adjustable mass flow rate at a plurality of peripherally spaced positions all between the first and second electrodes whereby the process gas flows through the arc path and is pyrolized, and nozzle means for the exhaust chamber.

14. Arc heater apparatus for chemical processing comprising, in combination, means forming an arc chamber, first and second coaxially and concentrically mounted radially spaced annular electrodes disposed in the arc chamber, means for producing and sustaining a radially extending arc between the first and second electrodes, means for generating a magnetic field having a predetermined orientation with respect to the path of the arc current for exerting a force on the arc and substantially continuously moving the arc in an annular path around and between said electrodes, means for admitting a process gas into the arc chamber at a plurality of peripherally spaced positions all radially between the first and second electrodes whereby the process gas flows through the arc path and is pyrolized, exhaust means for the arc chamber including a throat portion of relatively small diameter and a portion downstream of the throat portion of relatively large diameter, the pyrolized and decomposed gas in the arc chamber being given a predetermined thermal energy which is a function of the power of the arc and is a function of the mass flow rate of the process gas, the gas passing from the arc chamber through the small diameter throat portion of the exhaust means and expanding into the portion of the exhaust means of large diameter whereby the speed of movement of the gas is increased and some of the thermal energy in the gas is changed to kinetic energy with a resultant cooling of the gas, the gas being cooled to a temperature at which a desired recombination product is present in substantial proportion.

15. Arc heater apparatus according to claim 14 including in addition heat exchanger means further along the downstream portion of the exhaust means of the arc heater apparatus for further removing heat from the gas and further reducing the temperature of the gas.

16. Arc heater apparatus for chemical processing according to claim 14 including in addition fluid header means disposed in the exhaust means near the throat portion, the fluid header means having inlet means and having a plurality of passageways communicating between the fluid header means and the inside of the nozzle passageway near the throat portion for introducing a quenching fluid into the gas as it flows through the throat portion of the nozzle, the fluid introduced into the gas from the fluid header further cooling the gas.

References Cited

UNITED STATES PATENTS

| 1,023,783 | 4/1912 | Knapp | 48—196X |
| 3,079,325 | 2/1963 | Butenuth et al. | 48—196UX |
| 2,823,243 | 2/1958 | Robinson | 48—196 |
| 3,445,191 | 5/1969 | Bruning et al. | 23—277 |

MORRIS O. WOLK, Primary Examiner

R. E. SERWIN, Assistant Examiner

U.S. Cl. X.R.

23—277; 204—171; 219—25, 121; 260—679; 313—156, 231